US012570773B2

(12) United States Patent
Tang et al.

(10) Patent No.: US 12,570,773 B2
(45) **Date of Patent: *Mar. 10, 2026**

(54) POLYMER, SOLID-STATE ELECTROLYTE, GEL ELECTROLYTE, AND BATTERY

(71) Applicant: ZHUHAI COSMX BATTERY CO., LTD., Zhuhai (CN)

(72) Inventors: Weichao Tang, Zhuhai (CN); Suli Li, Zhuhai (CN); Wei Zhao, Zhuhai (CN); Junyi Li, Zhuhai (CN); Yanming Xu, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 496 days.

This patent is subject to a terminal disclaimer.

(21) Appl. No.: 18/168,745

(22) Filed: Feb. 14, 2023

(65) Prior Publication Data

US 2023/0265223 A1 Aug. 24, 2023

Related U.S. Application Data

(63) Continuation-in-part of application No. PCT/CN2021/135454, filed on Dec. 3, 2021, and a continuation-in-part of application No. PCT/CN2021/116762, filed on Sep. 6, 2021.

(30) Foreign Application Priority Data

Sep. 15, 2020 (CN) ......................... 202010969104.9
Dec. 3, 2020 (CN) ......................... 202011396209.6

(51) Int. Cl.
*C08F 20/06* (2006.01)
*C08F 20/44* (2006.01)
*H01M 10/0565* (2010.01)

(52) U.S. Cl.
CPC .............. *C08F 20/06* (2013.01); *C08F 20/44* (2013.01); *H01M 10/0565* (2013.01); *H01M 2300/0068* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

2007/0287070 A1 12/2007 Okumura et al.
2009/0104538 A1 4/2009 Wakihara et al.
2010/0009266 A1* 1/2010 Itoh .................... H01M 10/052 429/231.95
2016/0028111 A1* 1/2016 Ahn .................. H01M 10/4235 429/303
2020/0227781 A1* 7/2020 Ahn .................. H01M 10/0569
2023/0129009 A1* 4/2023 Tang ..................... H01M 4/602 429/317

FOREIGN PATENT DOCUMENTS

| | | | | |
|---|---|---|---|---|
| CN | 1502644 | A | | 6/2004 |
| CN | 102104171 | A | | 6/2011 |
| CN | 103772607 | A | | 5/2014 |
| CN | 104919638 | A | | 9/2015 |
| CN | 106207256 | A | | 12/2016 |
| CN | 108028424 | A | | 5/2018 |
| CN | 109037770 | A | | 12/2018 |
| CN | 109575187 | A | | 4/2019 |
| CN | 111253523 | A | | 6/2020 |
| CN | 111499663 | A | | 8/2020 |
| CN | 115894803 | A | * | 4/2023 |
| JP | 2001114834 | A | | 4/2001 |
| JP | 2002216844 | A | * | 8/2002 |
| JP | 2003092138 | A | | 3/2003 |
| JP | 2005347048 | A | | 12/2005 |
| JP | 2012256506 | A | | 12/2012 |

(Continued)

OTHER PUBLICATIONS

Machine translation of JP2002-216844 A, published on Aug. 2, 2002 (Year: 2002).*
International Search Report and Written Opinion issued in corresponding PCT Application No. PCT/CN2021/116762, dated Nov. 19, 2021.
International Search Report and Written Opinion issued in corresponding PCT Application No. PCT/CN2021/135454, dated Jan. 27, 2022.

*Primary Examiner* — Anca Eoff
(74) *Attorney, Agent, or Firm* — Westbridge IP LLC

(57) ABSTRACT

Disclosed are a polymer, a solid-state electrolyte including the polymer, a gel electrolyte, and a battery. The polymer includes a repeating unit A. The repeating unit A has a structure represented by Formula 1. In Formula 1, $R_1$ is selected from H or $C_{1-6}$ alkyl; $R_2$ is a linking group; $R_3$ is an end-capping group; M is selected from a borate chain segment, an aluminate chain segment, or a phosphate chain segment; and * denotes a linking end. The solid-state electrolyte including the polymer in the present disclosure or the battery including the gel electrolyte has a lower internal resistance, better transmission performance of ions, better cycle performance, a broader electrochemical window, and higher electrochemical stability.

Formula 1

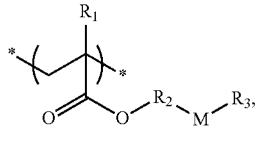

12 Claims, 2 Drawing Sheets

(56) References Cited

FOREIGN PATENT DOCUMENTS

| | | | | |
|---|---|---|---|---|
| WO | 2006132339 | A1 | 12/2006 | |
| WO | 2015046591 | A1 | 4/2015 | |
| WO | 2017190366 | A1 | 11/2017 | |
| WO | WO-2020107857 | A1 * | 6/2020 | ........ H01M 10/0565 |

* cited by examiner

POLYMER, SOLID-STATE ELECTROLYTE, GEL ELECTROLYTE, AND BATTERY

CROSS-REFERENCE TO RELATED APPLICATIONS

The present disclosure is a continuation-in-part of International Application No. PCT/CN2021/135454 filed on Dec. 3, 2021, which claims priority to Chinese Patent Application No. CN202011396209.6 filed on Dec. 3, 2020. The present disclosure is also a continuation-in-part of International Application No. PCT/CN2021/116762 filed on Sep. 6, 2021, which claims priority to Chinese Patent Application No. CN202010969104.9 filed on Sep. 15, 2020. The disclosures of the aforementioned applications are hereby incorporated by reference in their entireties.

TECHNICAL FIELD

The present disclosure relates to the field of battery technologies, and in particular, to a polymer, a solid-state electrolyte including the polymer, a battery including the solid-state electrolyte, a gel electrolyte including the polymer, and a battery including the gel electrolyte.

BACKGROUND

Batteries have advantages such as high energy density, long cycle life, low self-discharge rate, and environmental protection, and therefore are widely used in the field of energy storage, power vehicles, notebook computers, mobile phones, cameras, and other consumer electronic products.

The batteries include solid-state batteries and gel batteries. With an increase of an energy density of the batteries, safety of the batteries in the two types of batteries urgently needs to be further improved.

SUMMARY

To achieve the foregoing object, a first aspect of the present disclosure provides a polymer. The polymer includes a repeating unit A. The repeating unit A has a structure represented by Formula 1:

Formula 1

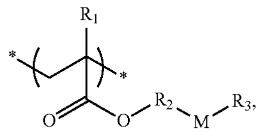

In Formula 1, $R_1$ is selected from H or $C_{1-6}$ alkyl; $R_2$ is a linking group; $R_3$ is an end-capping group; M is selected from a borate chain segment, an aluminate chain segment, or a phosphate chain segment; and * denotes a linking end.

In an instance, $R_1$ is selected from H, methyl, ethyl, or propyl; and/or $R_3$ is selected from H, OH, or COOH.

In an instance, the polymer is a solid-state polymer.

In an instance, the polymer is a gel polymer. The gel polymer includes the repeating unit A and a repeating unit from a gellable monomer.

A second aspect of the present disclosure provides a solid-state electrolyte, including the polymer according to the first aspect. The polymer is a solid-state polymer.

A third aspect of the present disclosure provides a gel electrolyte, including the polymer according to the first aspect. The polymer is a gel polymer.

A fourth aspect of the present disclosure provides a battery, including the solid-state electrolyte according to the second aspect.

A fifth aspect of the present disclosure provides a battery, including the gel electrolyte according to the third aspect.

The present disclosure has the following beneficial effects.

The electrolyte including the polymer in this disclosure has a higher electrical conductivity, and may effectively improve transmission performance of ions, reduce an internal resistance of a battery, and effectively improve cycle performance of the battery. In addition, high-voltage withstand performance of the polymer electrolyte may be effectively improved. When the electrolyte is used in the solid-state battery, the solid-state battery may have better mechanical performance.

DETAILED DESCRIPTIONS OF THE EMBODIMENTS

Figure 1:
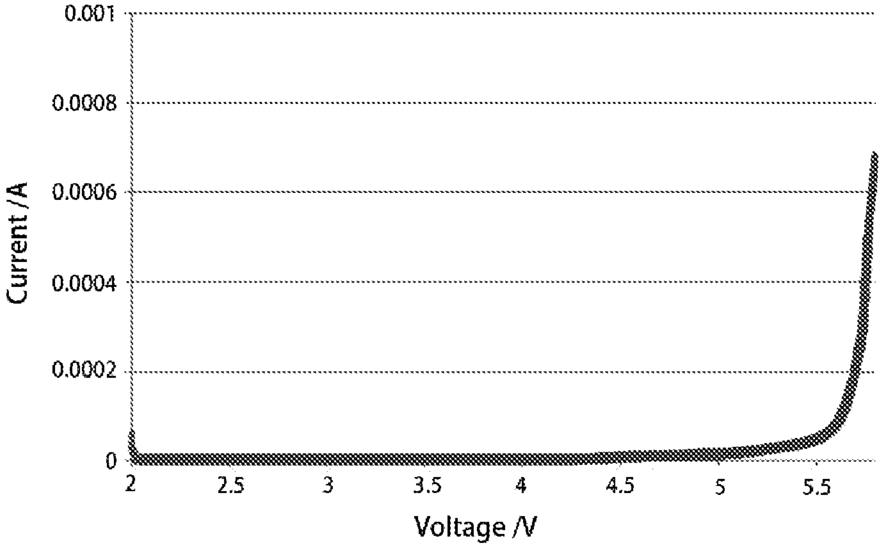
FIG. 1 shows test results of an LSV curve of a gel polymer electrolyte prepared in Example II1.

The technical solutions of the present application are further described in detail below with reference to specific examples. It should be understood that the following examples are merely used to illustrate and explain the present application, and shall not be construed as limitation to the protection scope of the present application. All technologies implemented based on the foregoing content of the present application shall fall within the protection scope of the present application.

Unless otherwise noted, raw materials and reagents used in the following examples are commercially available commodities, or may be prepared by using a known method.

<Polymer>

The first aspect of the present disclosure provides a polymer. The polymer includes a repeating unit A. The repeating unit A has a structure represented by Formula 1:

Formula 1

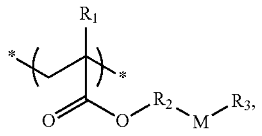

in Formula 1, $R_1$ is selected from H or $C_{1-6}$ alkyl; $R_2$ is a linking group; $R_3$ is an end-capping group; M is selected from a borate chain segment, an aluminate chain segment, or a phosphate chain segment; and * denotes a linking end.

In an instance, $R_1$ is selected from H or $C_{1-3}$ alkyl (that is, methyl, ethyl, or propyl).

In an instance, $R_1$ is selected from H or methyl.

In an instance, $R_3$ is selected from H, OH, or COOH.

In an instance, $R_2$ is a linking group formed after a hydroxyl group in

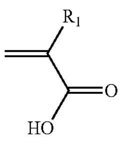

reacts with $R_3'$ in

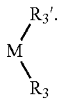

In fact, $R_2$ is a residue of $R_3'$.

In an instance, $R_3'$ and $R_3$ each are independently selected from H, OH, and COOH.

In an instance, the borate chain segment has a structural unit represented by Formula 2 or Formula 3:

Formula 2

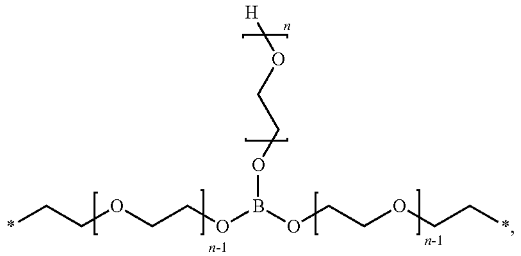

and

Formula 3

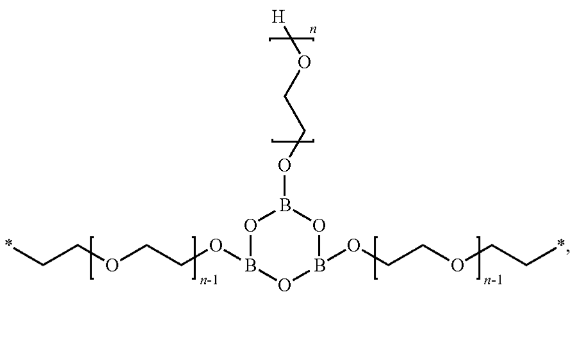

in Formula 2 and Formula 3, * denotes a linking end, and n is a polymerization degree.

In an instance, the aluminate chain segment has a structural unit represented by Formula 4:

Formula 4

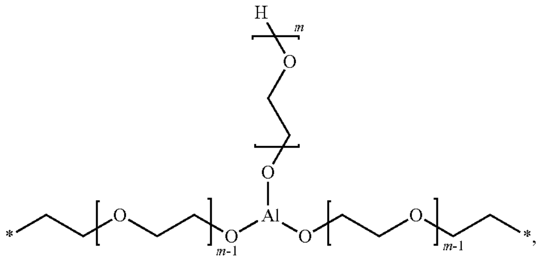

in Formula 4, * denotes a linking end, and m is a polymerization degree.

In an instance, the phosphate chain segment has a structural unit represented by Formula 5

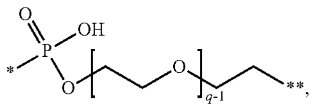

in Formula 5, * denotes a linking end to $R_3$, ** denotes a linking end to $R_2$, and q is a polymerization degree.

In an instance, a number average molecular weight of M ranges from 200 Da to 10000 Da, for example, 200 Da, 500 Da, 800 Da, 1000 Da, 1500 Da, 2000 Da, 2500 Da, 3000 Da, 3500 Da, 4000 Da, 4500 Da, 5000 Da, 5500 Da, 6000 Da, 6500 Da, 7000 Da, 7500 Da, 8000 Da, 8500 Da, 9000 Da, 9500 Da, or 10000 Da.

In an instance, a monomer used for preparing the repeating unit represented by Formula 1 is selected from a compound represented by the following Formula 6:

Formula 6

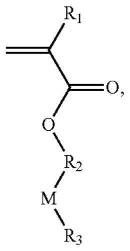

in Formula 6, $R_1$, $R_2$, $R_3$, and M are defined above.

In an instance, the polymer monomer represented by Formula 6 is selected from at least one of polyether borate acrylate, polyether aluminate acrylate, polyether phosphate acrylate, polyether borate methacrylate, polyether aluminate methacrylate, and polyether phosphate methacrylate.

In an instance, a molecular weight of the polymer monomer ranges from 100 Da to 10000 Da, for example, 100 Da, 500 Da, 1000 Da, 2000 Da, 3000 Da, 4000 Da, 5000 Da, 7000 Da, or 10000 Da.

In different application scenarios, the polymer may exist in a solid state or in a gel state.

<Solid-State Polymer>

In a specific implementation, the polymer exists in the solid state, and is referred to as the "solid-state polymer" in this specification.

In an instance, a number average molecular weight of the solid-state polymer ranges from 4000 Da to 300000 Da. For example, the number average molecular weight of the solid-state polymer is 4000 Da, 5000 Da, 6000 Da, 7000 Da, 8000 Da, 9000 Da, 10000 Da, 20000 Da, 50000 Da, 80000 Da, 100000 Da, 150000 Da, 200000 Da, 250000 Da, or 300000 Da.

In an instance, the solid-state polymer is a homopolymer or a copolymer formed by the polymer monomer represented by Formula 6. In other words, the solid-state polymer is entirely formed by the repeating unit A.

In an instance, the solid-state polymer is selected from at least one of poly(polyether borate acrylate), poly(polyether aluminate acrylate), poly(polyether phosphate acrylate), poly(polyether borate methacrylate), poly(ether aluminate methacrylate), and poly(ether phosphate methacrylate). That is to say, the solid-state polymer is selected from at least one of the polymers formed by C═C open-bond polymerization of one or more of the polymer monomers represented by Formula 6.

In this disclosure, "poly(poly . . . )" indicates a new polymer formed by polymerizing the polymer in the bracket. Taking "poly(polyether borate acrylate)" as an example, polyether borate acrylate is a polymer monomer represented by Formula 6, whose polymerase chain segment is represented at the M group; and when the polymer monomer represented by Formula 6 is polymerized again, the C═C groups are opened and connected with each other to form the solid-state polymer "poly(polyether borate acrylate)", whose polymerized segment is represented at the —C—C— group near $R_1$.

The solid-state polymer has a lower crystallization degree due to its branched chain structure.

In an instance, the solid-state polymer has a comb-like structure.

<Gel Polymer>

In another specific implementation, the polymer exists in a gel state, and is referred to as the "gel polymer" in this specification.

To implement the gel state, in addition to the foregoing repeating unit A, the gel polymer may further include a repeating unit from a gellable monomer. In other words, the gel polymer includes the repeating unit A and the repeating unit from the gellable monomer. In this specification, the "gellable monomer" is a monomer capable of forming a gellable polymer, for example, at least one of acrylonitrile and its modified derivatives, and acrylate and its modified derivatives. The repeating unit A is mainly used to improve an electrical conductivity, an electrochemical window, and the like. The repeating unit from the gellable monomer is mainly used to reduce a crystallization degree of the gel polymer and improve gelation of the gel polymer and an electrolytic solution.

In an instance, the repeating unit from the gellable monomer includes a repeating unit B and/or a repeating unit C.

The repeating unit B has a structure represented by Formula 7:

Formula 7

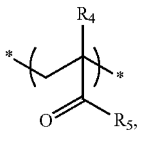

The repeating unit C has a structure represented by Formula 7':

Formula 7'

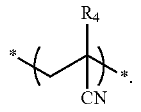

Herein, $R_4$ is selected from H or $C_{1-6}$ alkyl; $R_5$ is selected from OH, $C_{1-6}$ alkoxy, or a polyether chain segment; and * denotes a linking end.

In an instance, $R_4$ is selected from H or $C_{1-3}$ alkyl.

In an instance, $R_5$ is selected from OH, $C_{1-3}$ alkoxy, or a polyether chain segment.

In an instance, the polyether chain segment has a structural unit represented by Formula 8:

Formula 8

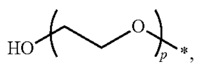

in Formula 8, * denotes a linking end, and p is a polymerization degree.

In an instance, a number average molecular weight of the polyether chain segment ranges from 60 Da to 3000 Da. For example, the number average molecular weight of the polyether chain segment is 60 Da, 100 Da, 200 Da, 300 Da, 400 Da, 500 Da, 700 Da, 1000 Da, 1300 Da, 1500 Da, 2000 Da, 2500 Da, or 3000 Da.

In an instance, in the gel polymer, a mole percent of the repeating unit A ranges from 30 mol % to 99 mol % (for example, 30 mol %, 40 mol %, 50 mol %, 60 mol %, 70 mol %, 80 mol %, 90 mol %, or 99 mol %), and a mole percent of one or more of the repeating unit B and the repeating unit C ranges from 1 mol % to 70 mol % (for example, 70 mol %, 60 mol %, 50 mol %, 40 mol %, 30 mol %, 20 mol %, 10 mol %, or 1 mol %).

In an instance, a monomer used for preparing the repeating unit represented by Formula 7 is selected from a compound represented by the following Formula 9:

Formula 9

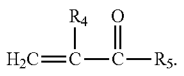

In Formula 9, $R_4$ and $R_5$ are defined above.

In an instance, a monomer used for preparing the repeating unit represented by Formula 7' is selected from a compound represented by the following Formula 9':

Formula 9'

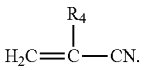

In Formula 9', $R_4$ is defined above.

In an instance, the gel polymer is selected from at least one of a copolymer of polyether borate acrylate and an acrylate monomer, a copolymer of polyether aluminate acrylate and the acrylate monomer, a copolymer of polyether phosphate acrylate and the acrylate monomer, a copolymer of polyether borate methacrylate and the acrylate monomer, a copolymer of ether aluminate methacrylate and the acrylate monomer, a copolymer of ether phosphate methacrylate and the acrylate monomer, a copolymer of polyether borate acrylate and an acrylonitrile monomer, a copolymer of polyether aluminate acrylate and the acrylonitrile monomer, a copolymer of polyether phosphate acrylate and the acrylonitrile monomer, a copolymer of polyether borate methacrylate and the acrylonitrile monomer, a copolymer of ether aluminate methacrylate and the acrylonitrile monomer, and a copolymer of ether phosphate methacrylate and the acrylonitrile monomer. The acrylate monomer includes at least one of acrylic acid, poly(ethylene glycol) monomethacrylate, poly(ethylene glycol) acrylate, methyl acrylate, ethyl acrylate, methyl methacrylate, and ethyl methacrylate. The acrylonitrile monomer includes at least one of acrylonitrile and methacrylonitrile.

In an instance, a number average molecular weight of the gel polymer ranges from 1000 Da to 500000 Da. For example, the number average molecular weight of the gel polymer is 1000 Da, 2000 Da, 3000 Da, 4000 Da, 5000 Da, 10000 Da, 20000 Da, 50000 Da, 100000 Da, 200000 Da, 300000 Da, 400000 Da, or 500000 Da.

In a preferable instance, the number average molecular weight of the gel polymer ranges from 5000 Da to 300000 Da.

In an instance, an electrical conductivity of the gel polymer is greater than $10^{-3}$ S/cm.

In a preferable instance, an electrical conductivity of the gel polymer is greater than 4.5 mS/cm.

<Method for Preparing the Gel Polymer>

The present disclosure further provides the method for preparing the gel polymer. The method for preparing the gel polymer includes the following steps: evenly mixing a first solvent, the compound represented by Formula 6, a gellable monomer, and an initiator for reaction to prepare the gel polymer.

In an instance, the preparation method includes the following steps: evenly mixing the first solvent, the compound represented by Formula 6, the compound represented by Formula 9 or Formula 9', and the initiator for reaction to prepare the gel polymer.

In an instance, an addition amount of the initiator ranges from 0.05 wt % to 1 wt % of a total mass of a polymer monomer, for example, 0.05 wt %, 0.1 wt %, 0.15 wt %, 0.2 wt %, 0.3 wt %, 0.4 wt %, 0.5 wt %, 0.7 wt %, 0.9 wt %, or 1 wt %.

In an instance, the initiator is selected from one or more of azobisisobutyronitrile, 2,2'-azobis(2,4-dimethyl)valeronitrile, dimethyl 2,2'-azobis(2-methylpropionate), benzoyl peroxide, tert-butyl peroxybenzoate, ethyl 4-(N,N-dimethylamino)benzoate, and methyl-2-benzoylbenzoate.

In an instance, the first solvent is selected from at least one of N-methyl pyrrolidone, acetonitrile, hydrofluoroether, acetone, tetrahydrofuran, dichloromethane, pyridine, xylene, and toluene.

In an instance, the method specifically includes the following steps: stirring 60 g-100 g of the compound represented by Formula 6, 0.5 g-50 g of the compound represented by Formula 9 or Formula 9', and 100 g-600 g of the first solvent for 120 min-600 min at a rotational speed ranging from 200 r/min to 2000 r/min in an argon gas atmosphere, then adding 0.01 g-0.5 g of the initiator, and reacting for 3 h-50 h under a condition of 50° C. to 95° C., to obtain the gel polymer.

<Solid-State Electrolyte>

A second aspect of the present disclosure provides a solid-state electrolyte, including the polymer according to the first aspect. The polymer is a solid-state polymer.

The solid-state electrolyte may further include a conventional component of a solid-state electrolyte generally used in a solid-state battery.

In an instance, the solid-state electrolytic further includes a lithium salt and an optional additive. In this specification, "optional" means that the component may or may not be included.

In an instance, a total mass of the solid-state electrolyte is used as a reference, a content of the solid-state polymer ranges from 60 wt % to 90 wt %, a content of the lithium salt ranges from 10 wt % to 30 wt %, and a content of the additive ranges from 0 wt % to 10 wt %.

For example, a weight percent of the solid-state polymer is 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 89.9 wt %, or 90 wt %.

For example, a weight percent of the lithium salt is 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

For example, a weight percent of the additive is 0 wt %, 0.1 wt %, 1 wt %, 2 wt %, 3 wt %, 4 wt %, 5 wt %, 6 wt %, 7 wt %, 8 wt %, 9 wt %, or 10 wt %.

In an instance, the lithium salt is selected from one or any combination of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium bis(oxalato)borate (LiBOB), lithium difluoro(oxalato)borate (LiDFOB), lithium bis(fluorosulfonyl)imide (LiFSI), lithium bis(trifluoromethanesulfonyl)imide (LiTFSI), lithium trifluoromethanesulfonate ($LiCF_3SO_3$), lithium hexafluoroantimonate ($LiSbF_6$), lithium difluorophosphate ($LiPF_2O_2$), lithium 4,5-dicyano-2-(trifluoromethyl)imidazol-1-ide (LiDTI), $LiN(SO_2C_2F_5)_2$, and $LiC(SO_2CF_3)_3$.

In an instance, the solid-state polymer electrolyte further includes an additive.

In an instance, the additive includes at least one of an oxide electrolyte, a nano-filler, and an organic additive.

In an instance, the oxide electrolyte is selected from at least one of lithium phosphate, lithium titanate, lithium titanium phosphate, lithium aluminum titanium phosphate, lithium lanthanum titanate, lithium lanthanum tantalate, lanthanum lithium platinum aluminum oxide, lithium aluminum germanium phosphate, lithium aluminum silicate, lithium silicon phosphate, lithium lanthanum titanate, and diboron trioxide-doped lithium phosphate.

In an instance, the nano-filler is selected from at least one of alumina, magnesia, boehmite, barium sulfate, barium titanate, zinc oxide, calcium oxide, silicon dioxide, silicon carbide, and nickel oxide.

In an instance, the organic additive is selected from at least one of methoxy polyethylene glycol borate (B-PEG), methoxy polyethylene glycol aluminate (Al-PEG), succinonitrile, vinyl ethylene carbonate, vinylene carbonate, fluoroethylene carbonate, and tetraethylene glycol dimethyl ether.

In an instance, the solid-state electrolyte is a solid-state polymer electrolyte membrane.

In an instance, a thickness of the solid-state polymer electrolyte membrane ranges from 10 μm to 150 μm.

<Method for Preparing the Solid-State Electrolyte>

The present disclosure further provides the method for preparing the solid-state electrolyte. The method for preparing the solid-state electrolyte includes the following steps:

(1) Evenly mixing a second solvent, the compound represented by Formula 6, and an initiator, and performing heating for a polymerization reaction, to prepare a solid-state polymer.

(2) Mixing the solid-state polymer in Step (1), a lithium salt, an optional additive, and a third solvent, coating a surface of a substrate with the mixed liquid, and performing drying in an inert gas atmosphere, to prepare the solid-state electrolyte.

In an instance, in Step (1), the mixing was, for example, performing stirring for 60 min-400 min (for example, 60 min, 100 min, 150 min, 200 min, 250 min, 300 min, 350 min, or 400 min) at a rotational speed ranging from 200 r/min to 2000 r/min (for example, 200 r/min, 500 r/min, 1000 r/min, 1200 r/min, 1500 r/min, or 2000 r/min). The mixing was performed in the inert gas atmosphere.

In an instance, in Step (1), a mass of the initiator ranges from 0.01 wt % to 0.5 wt % (for example, 0.01 wt %, 0.05 wt %, 0.1 wt %, 0.2 wt %, 0.3 wt %, 0.4 wt %, or 0.5 wt %) of a total mass of the compound represented by Formula 6. A mass of the second solvent ranges from 1 time to 10 times (for example, 1 time, 2 times, 3 times, 4 times, 5 times, 6 times, 7 times, 8 times, 9 times, or 10 times) the total mass of the compound represented by Formula 6. For example, the mass of the second solvent ranges from 100 g to 600 g, and the mass of the compound represented by Formula 6 ranges from 60 g to 100 g.

In an instance, in Step (1), a temperature of the polymerization reaction ranges from 50° C. to 90° C. (for example, 50° C., 60° C., 70° C., 80° C., or 90° C.), and a time of the polymerization reaction ranges from 2 h to 60 h (for example, 2 h, 5 h, 10 h, 20 h, 30 h, 40 h, 50 h, or 60 h).

In an instance, in Step (1), the initiator is selected from one or more of azobisisobutyronitrile, 2,2'-azobis(2,4-dimethyl)valeronitrile, dimethyl 2,2'-azobis(2-methylpropionate), benzoyl peroxide, tert-butyl peroxybenzoate, ethyl 4-(N,N-dimethylamino)benzoate, and methyl-2-benzoylbenzoate.

In an instance, in Step (2), the mixing was, for example, performing stirring for 2 h-15 h (for example, 2 h, 5 h, 8 h, 10 h, 12 h, or 15 h) at a rotational speed ranging from 200 r/min to 2000 r/min (for example, 200 r/min, 500 r/min, 1000 r/min, 1200 r/min, 1500 r/min, or 2000 r/min). The mixing was performed in the inert gas atmosphere.

In an instance, in Step (2), a temperature of the drying ranges from 60° C. to 100° C. (for example, 60° C., 70° C., 80° C., 90° C., or 100° C.), and a time of the drying ranges from 24 h to 80 h (for example, 24 h, 30 h, 40 h, 50 h, 60 h, 70 h, or 80 h).

In an instance, in Step (2), the excess solvent may be removed in a process of the drying, to implement preparation of the solid-state electrolyte.

In an instance, in Step (2), a mass ratio of the polymer in Step (1), the lithium salt, and the optional additive is (60-90):(10-30):(0-10).

In an instance, in Step (2), a mass ratio of the polymer in Step (1) and the third solvent is (60-90):(100-800).

In an instance, in Step (1), the second solvent is selected from at least one of N-methyl pyrrolidone, acetonitrile, hydrofluoroether, acetone, tetrahydrofuran, dichloromethane, pyridine, xylene, and toluene.

In an instance, in Step (2), the third solvent is selected from at least one of N-methyl pyrrolidone, acetonitrile, hydrofluoroether, acetone, tetrahydrofuran, dichloromethane, pyridine, xylene, and toluene.

For example, the method for preparing the solid-state electrolyte includes the following steps:

S1: Stirring 60 g-100 g of the compound represented by Formula 6 and 100 g-600 g of the second solvent for 60 min-400 min at a rotational speed ranging from 200 r/min to 2000 r/min in an argon gas atmosphere, then adding 0.01 g-0.2 g of the initiator, and reacting for 2 h-60 h under a condition of 50° C.-95° C., to obtain the solid-state polymer A after purification processing.

S2: Adding 60 g-90 g of the solid-state polymer A, 10 g-30 g of the lithium salt, and 0 g-10 g of the additive to 100 g-800 g of the solvent, performing stirring for 2 h-15 h at a rotational speed ranging from 200 r/min to 2000 r/min in an inert gas atmosphere, evenly coating a mold with smooth surfaces with the mixed liquid, introducing an inert gas into a vacuum drying tank, setting the model aside for 10 h-64 h in the inert gas atmosphere to remove the excess solvent, and performing drying for 24 h-80 h in the vacuum drying tank at 60° C.-100° C., to obtain the solid-state electrolyte.

<Gel Electrolyte>

A third aspect of the present disclosure provides a gel electrolyte, including the polymer according to the first aspect. The polymer is a gel polymer.

Other than the gel polymer, the gel electrolyte may further include a conventional component of an electrolyte generally used in a non-solid-state battery.

In an instance, the gel electrolyte further includes an electrolyte.

In an instance, the electrolyte comes from an electrolytic solution. The electrolytic solution is an electrolytic solution commonly used in this field. For example, the electrolytic solution is purchased commercially, and is applicable to an electrolytic solution in a battery (especially lithium-ion battery).

<Battery (Solid-State Battery)>

A fourth aspect of the present disclosure provides a battery, including the solid-state electrolyte according to the second aspect.

In an instance, the battery is secondary battery.

In an instance, the battery is lithium-ion battery.

In an instance, the battery further includes a positive electrode and a negative electrode.

In an instance, the battery includes a solid-state polymer electrolyte membrane.

In an instance, the solid-state polymer electrolyte membrane of the battery further includes the foregoing solid-state electrolyte.

In an instance, the solid-state polymer electrolyte membrane is disposed between the positive electrode and the negative electrode.

In an instance, a positive electrode plate, the solid-state electrolyte (preferably, the solid-state polymer electrolyte membrane), and a negative electrode plate were laminated to prepare a solid-state battery cell, and welding and packaging were performed to obtain the battery.

Being a next-generation battery closest to application, the solid-state battery is a key direction of future development of the battery. A core material of the solid-state battery is a solid-state electrolyte. Currently, the solid-state electrolyte mainly includes an oxide electrolyte, a sulfide electrolyte, and a polymer electrolyte. The oxide electrolyte has a problem such as a low electrical conductivity and poor interface contact. The sulfide electrolyte has a problem such as a high processing requirement, poor anti-oxidation performance, and a solid-solid interface. Polyethylene oxide (PEO) is a common polymer electrolyte, but has a problem such as a low electrical conductivity and poor anti-oxidation potential performance. These problems limit application of the polymer electrolyte.

The solid-state polymer included in the solid-state electrolyte in the present disclosure may improve mechanical properties of the solid-state electrolyte, so that the solid-state polymer electrolyte may have better mechanical properties, thereby effectively improving cycle performance of the battery and implementing a higher electrical conductivity of ions.

In comparison with the conventional polymer electrolyte (for example, a PEO polymer electrolyte), the solid-state polymer in the present disclosure has a branched chain structure, thereby having a lower crystallization degree. Therefore, ions in an amorphous region of the solid-state polymer electrolyte has a higher electrical conductivity of ions. In addition, a branched chain of the solid-state polymer in this disclosure is polyether borate, polyether aluminate, or polyether phosphate. The branched chain structure may also effectively promote dissociation of the lithium salt in the solid-state polymer electrolyte, to further improve a ion conductivity.

By using the solid-state polymer electrolyte of the present disclosure, the prepared battery further has better mechanical properties and cycle performance. The solid-state polymer in the present disclosure is a polymer with a comb-like polyether structure. The polymer with the comb-like polyether structure may be used to improve the mechanical properties of the solid-state polymer electrolyte. In comparison with the conventional polymer electrolyte (for example, a PEO polymer electrolyte), the solid-state polymer electrolyte in the present disclosure may have better mechanical properties at the same temperature, thereby effectively improving cycle performance of the battery.

The solid-state polymer electrolyte of the present disclosure has a broader electrochemical window that may match a high-voltage system. A main chain of the solid-state polymer electrolyte in the present disclosure uses acrylate as a reactivity group. A branched chain is polyether borate, polyether aluminate, polyether phosphate, or the like. Adding polyether borate, polyether aluminate, or polyether phosphate may effectively broaden the electrochemical window of the solid-state polymer electrolyte, to match a high-voltage system material and prepare a battery with a higher energy density.

<Battery (Gel Battery)>

A fifth aspect of the present disclosure provides a battery, including the gel electrolyte according to the third aspect.

In an instance, the battery is secondary battery.

In an instance, the battery is lithium-ion battery.

In an instance, the battery further includes a positive electrode, a negative electrode, and a separator. The positive electrode, the negative electrode, the separator, and the gel electrolyte are assembled in a conventional manner to form the battery.

The gel electrolyte in this disclosure may be obtained through contact between the gel polymer and an electrolyte. For example, the gel polymer was soaked in the electrolyte for a period of time, and then was taken out to obtain the gel electrolyte. A time for the soaking is not specifically limited, provided that the gel polymer was fully soaked.

The gel electrolyte in this disclosure has a higher electrical conductivity, and may effectively improve transmission performance of ions and reduce an internal resistance of the battery. At least one of polyether borate, polyether aluminate, and polyether phosphate is introduced in the gel electrolyte in the present disclosure, to effectively improve high-voltage withstand performance of the polymer electrolyte.

In the present disclosure, a gel polymer different from that in the conventional technology was selected, and the gel polymer was in contact with the electrolyte in the battery to form the gel electrolyte, to prepare the battery including the gel electrolyte. The gel electrolyte has a high electrical conductivity, and may replace an existing solid-state polyethylene oxide electrolyte, to effectively improve transmission performance of ions and reduce an internal resistance of the solid-state battery. In addition, the battery including the gel electrolyte reduces an internal resistance of the battery. In addition, the battery including the gel electrolyte has good anti-oxidation potential performance. This greatly extends application of the gel polymer in a high-voltage system, improves electrochemical stability of the gel polymer, effectively improves an energy density of the battery, and broadens application fields of the gel polymer.

In the present disclosure, a functional polymer monomer is used to replace polyethylene oxide in the gel polymer. A molecular weight of the functional polymer monomer ranges from 100 Da to 10000 Da. The functional polymer monomer may be efficiently dissolved in a solvent, so that prepared slurry has a high solid content and a low viscosity and is easily processed. In addition, the functional polymer monomer and a gellable monomer may be polymerized to prepare the gel polymer. The gel polymer has a lower crystallization degree and a better electrical conductivity than polyethylene oxide. The functional polymer monomer further has an acrylate group, to better adsorb small carbonate molecules in the electrolyte, thereby forming a continuous lithium conducting channel and effectively improving performance of the battery. The functional polymer monomer is in a liquid state or a semi-solid state at a normal temperature. However, after the functional polymer monomer is polymerized with the gellable monomer, a compact gel polymer may be prepared, and a gel electrolyte is further formed after the gel polymer is in contact with the electrolyte.

A polyethylene oxide electrolyte used in a conventional solid-state battery has relatively poor high-voltage withstand performance, especially for a voltage higher than 3.8 V. At least one of polyether borate, polyether aluminate, and polyether phosphate is introduced in the gel electrolyte in the present disclosure, to effectively improve high-voltage withstand performance of the polymer electrolyte. High-voltage withstand performance of the polymer electrolyte is significantly improved in comparison with the conventional polyethylene oxide electrolyte.

In comparison with the conventional polyethylene oxide electrolyte, the gel electrolyte in the present disclosure has a higher electrical conductivity of ions and a higher ion continuity. When the gel electrolyte in the present disclosure is compared with the polyethylene oxide electrolyte, the polymer has a branched chain structure, thereby having a lower crystallization degree. Therefore, ions in the gel electrolyte has a higher electrical ion conductivity. In addition, a branched chain of the gel polymer is at least one of polyether borate, polyether aluminate, and polyether phosphate, to effectively promote dissociation of a lithium salt in the gel electrolyte, thereby further improving a ion conductivity and broadening an electrochemical window of the gel electrolyte.

The present disclosure is further described in detail below with reference to specific embodiments. It should be understood that the following embodiments are merely for the purposes of illustrating and explaining the present disclosure, and should not be construed as limiting the scope of protection of the present disclosure. Any technology implemented based on the foregoing content of the present disclosure falls within the intended scope of protection of the present disclosure.

Experimental methods used in the following examples are all conventional methods unless otherwise specified, and reagents, materials, and the like that are used in the following examples may be all obtained commercially unless otherwise specified.

The molecular weight of the polymer or the polymer monomer used in the following embodiments represents number-average molecular weight.

GROUP I EXAMPLES

Group I examples are used to describe the solid-state polymer, the solid-state electrolyte, and the solid-state battery in the present disclosure.

A structural formula of polyether acrylate or polyether methacrylate used in Group I examples is represented by Formula 10:

Formula 10

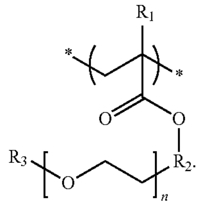

If polyether acrylate is used, $R_1$ is H, $R_2$ is absent, and $R_3$ is H.

If polyether methacrylate is used, $R_1$ is $CH_3$, $R_2$ is absent, and $R_3$ is H.

A structural formula of polyether borate used in Group I examples is represented by Formula 11:

Formula 11

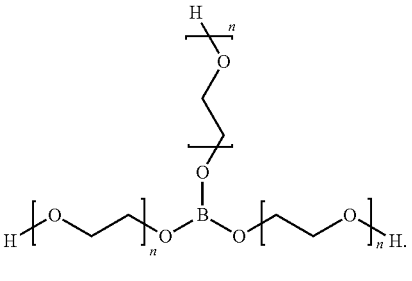

A structural formula of polyether aluminate used in the following examples is represented by Formula 12:

Formula 12

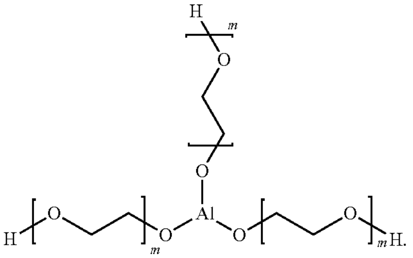

A structural formula of polyether phosphate used in Group I examples is represented by Formula 13:

Formula 13

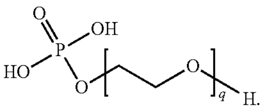

Example I1

(1) Preparation of a Solid-State Polymer Electrolyte Membrane

S1: Stirring 75 g polyether borate acrylate and 300 g of a second solvent for 200 min at a rotational speed of 800 r/min in an inert gas atmosphere, then adding 0.05 g of an initiator: azobisisobutyronitrile, and reacting for 4 h under a condition of 60° C., to obtain a solid-state polymer after purification processing.

S2: Adding 30 g of the foregoing prepared solid-state polymer: poly(polyether borate acrylate), 5 g of the lithium salt, and 2 g of an additive to 300 g of a solvent, performing stirring for 4 h at a rotational speed of 1000 r/min in an inert gas atmosphere, evenly coating a mold with smooth surfaces with the mixed liquid, introducing an inert gas into a vacuum drying tank, setting the model aside for 24 h in the inert gas atmosphere to remove the excess solvent, and performing drying for 30 h in the vacuum drying tank at 80° C., to obtain the solid-state polymer electrolyte membrane.

(2) Preparation of a Positive Electrode Plate

Evenly mixing 80 g of a positive electrode active material, 5 g of a conductive agent, 12 g of a polymer electrolyte (a polymer electrolyte in powder form obtained after drying a mixed liquid same as that in S2 of step (1)), 2 g of a lithium salt, 1 g of a binder, and 200 g of a solvent, coating surfaces of an aluminum foil current collector with the mixed liquid, and performing drying, compacting, and cutting to obtain the positive electrode plate.

(3) Preparation of a Negative Electrode Plate

Dissolving 2 g silicon monoxide, 3 g lithium metal powder, 4 g of a conductive agent: conductive carbon black, and 0.5 g of a binder: oil-based acrylate in 100 g p-xylene, performing evenly mixing, coating surfaces of a copper foil of a negative electrode current collector with the mixed liquid, and performing drying (at a temperature of 100° C. for a time of 20 h in an argon gas atmosphere), compacting, and die cutting to obtain the negative electrode plate.

(4) Preparation of a Lithium-Ion Battery

Laminating the positive electrode plate, the solid-state polymer electrolyte membrane, and the negative electrode plate that were obtained above to prepare a solid-state lithium-ion battery cell, and performing welding and packaging to obtain the lithium-ion battery.

Comparative Example I1.1

Reference is made to Example I1 for a specific process. A difference is that polyether borate with the same weight was used in Comparative Example I1.1 to replace polyether borate acrylate in Example I1. Other conditions in Example I1 remained unchanged.

Comparative Example I1.2

Reference is made to Example I1 for a specific process. A difference is that a mixture of polyether borate and polyacrylate with the same weight as a polyether borate acrylate monomer was used in Comparative Example I1.2 to replace polyether borate acrylate in Example I1, where a mass ratio of polyether borate and polyacrylate was a molecular weight ratio of polyether borate and acrylate in the polyether borate acrylate monomer. Other conditions in Example I1 remained unchanged.

Comparative Example I1.3

Reference is made to Example I1 for a specific process. A difference is that polyether acrylate with the same weight as a polyether borate acrylate monomer was used in Comparative Example 11.3 to replace polyether borate acrylate in Example I1. Other conditions in Example I1 remained unchanged.

Other Examples and Other Comparative Examples

Reference is made to Example I1 for a specific procedure. Differences are conditions in processes for preparing the solid-state polymer electrolyte, addition amounts of components, and types of component materials. For details, refer to Table 1 and Table 2. In comparative examples in which two polymers were added in Table 2, addition amounts of the two polymers were a ratio between molecular weights of a polymer chain segment and poly(methyl) acrylate in a polymer monomer added in a corresponding example. For details, refer to descriptions of Comparative Examples 1 and 2.

TABLE 1

Contents of preparation components of the solid-state polymer electrolytes in examples and comparative examples

| Number | Second solvent/g | Compound represented by Formula 6/g | Initiator/g | Solid-state polymer/g | Lithium salt/g | Additive/g | Third solvent/g |
|---|---|---|---|---|---|---|---|
| Example 11 | 300 | 75 | 0.05 | 30 | 5 | 2 | 200 |
| Comparative Example I1.1 | 300 | 75 | 0.05 | 30 | 5 | 2 | 200 |
| Comparative Example I1.2 | 300 | 75 | 0.05 | 30 | 5 | 2 | 200 |
| Comparative Example I1.3 | 300 | 75 | 0.05 | 30 | 5 | 2 | 200 |
| Example I2 | 500 | 95 | 0.09 | | 20 | 5 | 700 |
| Comparative Example 12.1 | 500 | 95 | 0.09 | 80 | 20 | 5 | 700 |
| Comparative Example I2.2 | 500 | 95 | 0.09 | 8 | 20 | 5 | 700 |
| Comparative Example I2.3 | 500 | 95 | 0.09 | 80 | 20 | 5 | 700 |
| Example I3 | 550 | 90 | 0.15 | 75 | 25 | 8 | 600 |
| Comparative Example I3.1 | 550 | 90 | 0.15 | 75 | 25 | 8 | 600 |
| Comparative Example I3.2 | 550 | 90 | 0.15 | 75 | 25 | 8 | 600 |
| Comparative Example I3.3 | 550 | 90 | 0.15 | 75 | 25 | 8 | 600 |
| Example I4 | 100 | 60 | 0.01 | 90 | 32 | 10 | 500 |
| Comparative Example I4.1 | 100 | 60 | 0.01 | 90 | 32 | 10 | 500 |
| Comparative Example I4.2 | 100 | 60 | 0.01 | 90 | 32 | 10 | 500 |
| Comparative Example I4.3 | 100 | 60 | 0.01 | 90 | 32 | 10 | 500 |
| Example I5 | 600 | 100 | 0.2 | 50 | 8 | 0 | 300 |
| Comparative Example I5.1 | 600 | 100 | 0.2 | 50 | 18 | 0 | 300 |
| Comparative Example I5.2 | 600 | 100 | 0.2 | 50 | 18 | 0 | 300 |
| Comparative Example I5.3 | 600 | 100 | 0.2 | 50 | 18 | 0 | 300 |
| Example I6 | 300 | 80 | 0.06 | 100 | 40 | 1 | 800 |
| Comparative Example I6.1 | 300 | 80 | 0.06 | 100 | 40 | 1 | 800 |
| Comparative Example I6.2 | 300 | 80 | 0.06 | 100 | 40 | 1 | 800 |
| Comparative Example I6.3 | 300 | 80 | 0.06 | 100 | 40 | 1 | 800 |

TABLE 2

Composition of preparation components in examples and comparative examples

| Number | Second solvent/ Third solvent | Additive | Polymer monomer/Polymer | Lithium salt |
|---|---|---|---|---|
| Example I1 | NMP/ Acetonitrile (1:1) | Lithium aluminum silicate: lithium titanate (1:2) | Polyether borate acrylate (monomer molecular weight: 300, polymer molecular weight: 40,000) | $LiBF_4$:LiTFSI (1:9) |
| Comparative Example I1.1 | | | Polyether borate (molecular weight: 300) | |
| Comparative Example I1.2 | | | Polyether borate (molecular weight: 300) + polyacrylate (polymer molecular weight: 40,000) | |
| Comparative Example I1.3 | | | Polyether acrylate (monomer molecular weight: 300, polymer molecular weight: 40,000) | |
| Example I2 | Acetonitrile | Lithium lanthanum titanate | Polyether aluminate acrylate (monomer molecular weight: 950, polymer molecular weight: 60,000) | LiFSI:LiTFSI (5:6) |
| Comparative Example I2.1 | | | Polyether aluminate (molecular weight: 950) | |
| Comparative Example I2.2 | | | Polyether aluminate (molecular weight: 950) + polyacrylate (polymer molecular weight: 60,000) | |
| Comparative Example I2.3 | | | Polyether acrylate (monomer molecular weight: 950, polymer molecular weight: 60,000) | |
| Example I3 | DMF | Lithium silicon phosphate | Polyether phosphate acrylate (monomer molecular weight: 1500, polymer molecular weight: 140,000) | $LiBF_4$:LiFSI (5:8) |
| Comparative Example I3.1 | | | Polyether phosphate (molecular weight: 1,500) | |
| Comparative Example I3.2 | | | Polyether phosphate (molecular weight: 1,500) + polyacrylate (polymer molecular weight: 140,000) | |
| Comparative Example I3.3 | | | Polyether acrylate (monomer molecular weight: 1500, polymer molecular weight: 140,000) | |
| Example I4 | Acetone | Diboron trioxide-doped lithium phosphate | Polyether borate methacrylate (monomer molecular weight: 10,000, polymer molecular weight: 200,000) | LiBOB:LiTFSI (3:5) |
| Comparative Example I4.1 | | | Polyether borate (molecular weight: 10,000) | |
| Comparative Example I4.2 | | | Polyether borate (molecular weight: 10,000) + polymethyl acrylate (polymer molecular weight: 200,000) | |
| Comparative Example I4.3 | | | Polyether methacrylate (monomer molecular weight: 10,000, polymer molecular weight: 200,000) | |
| Example I5 | Hydro-fluoroether | Lithium aluminum silicate: llithium titanium phosphate (2:7) | Polyether aluminate methacrylate (monomer molecular weight: 5,000, polymer molecular weight: 150,000) | LiFSI:LiTFSI (1:5) |
| Comparative Example I5.1 | | | Polyether aluminate (molecular weight: 5,000) | |
| Comparative Example I5.2 | | | Polyether aluminate (molecular weight: 5,000) + polymethyl acrylate (polymer molecular weight: 150,000) | |
| Comparative Example I5.3 | | | Polyether methacrylate (monomer molecular weight: 5000, polymer molecular weight: 150,000) | |
| Example I6 | NMP/ Acetonitrile (2:1) | Lanthanum lithium platinum aluminum oxide:lithium silicon phosphate (3:1) | Polyether phosphate methacrylate (monomer molecular weight: 100, polymer molecular weight: 90,000) | LiODFB: LiBOB:LiTFSI (1:2:6) |
| Comparative Example I6.1 | | | Polyether phosphate (molecular weight: 100) | |
| Comparative Example I6.2 | | | Polyether phosphate (molecular weight: 100) + polymethyl acrylate (polymer molecular weight: 90,000) | |
| Comparative Example I6.3 | | | Polyether methacrylate (monomer molecular weight: 100, polymer molecular weight: 90,000) | |

Test Example I

The following tests were performed on the products obtained in Group I examples and Group I comparative examples:

(1) Test for an Electrical Conductivity

The solid-state polymer electrolyte membranes prepared in Group I examples and Group I comparative examples were cut. Then, the solid-state polymer electrolyte membranes and a processed stainless steel pad were assembled to obtain a stainless steel/solid-state electrolyte/stainless steel button cell. A diameter of the stainless steel pad and a thickness of the solid-state polymer electrolyte membrane were tested. A Metrohm Metrohm PGSTAT302N chemical workstation was used under a condition of 25° C. to test a battery by using a frequency ranging from 100 kHz to 0.1 mHz, and calculation was performed. Results were recorded in Table 3.

(2) Test of an Electrochemical Window

A Metrohm PGSTAT302N chemical workstation was used under a condition of 25° C. to test a button battery through assembling stainless steel/a solid-state electrolyte/metal lithium at 2 V-5 V. Test results are shown in Table 3.

(3) Test Method of Cycle Performance of a Battery

Charge and discharge cycle tests were performed on a lithium-ion battery on a LAND battery charge and discharge test cabinet, where a test condition was 60° C., and charging and discharging were performed at 0.3° C./0.3° C.; and a quantity of cycles when a battery capacity retention was decreased to 80% was tested. Results were recorded in Table 3.

TABLE 3

| Number | Electrical conductivity (mS/cm) | Electrochemical window/V | Cycle performance 0.3 C/0.3 C |
|---|---|---|---|
| Example I1 | 1.65 | 4.40 | 1020 cycles (80%) |
| Comparative Example I1.1 | 2.54 | 4.30 | 10 cycles (a battery is short circuited) |
| Comparative Example I1.2 | 0.83 | 4.35 | 3 cycles (a battery is short circuited) |
| Comparative Example I1.3 | 1.59 | 4.15 | 650 cycles (80%) |
| Example I2 | 1.89 | 4.35 | 3030 cycles (80%) |
| Comparative Example I2.1 | 2.67 | 4.25 | 5 cycles (a battery is short circuited) |
| Comparative Example I2.2 | 0.92 | 4.30 | 12 cycles (a battery is short circuited) |
| Comparative Example I2.3 | 1.75 | 4.10 | 2700 cycles (80%) |
| Example I3 | 2.34 | 4.30 | 520 cycles (80%) |
| Comparative Example I3.1 | 4.52 | 4.20 | 7 cycles (a battery is short circuited) |
| Comparative Example I3.2 | 1.43 | 4.25 | 15 cycles (a battery is short circuited) |
| Comparative Example I3.3 | 2.27 | 4.10 | 312 cycles (80%) |
| Example I4 | 2.83 | 4.45 | 1810 cycles (80%) |
| Comparative Example I4.1 | 3.21 | 4.30 | 6 cycles (a battery is short circuited) |
| Comparative Example I4.2 | 1.03 | 4.40 | 14 cycles (a battery is short circuited) |
| Comparative Example I4.3 | 2.31 | 4.10 | 1205 cycles (80%) |
| Example I5 | 2.12 | 4.35 | 2579 cycles (80%) |
| Comparative Example I5.1 | 2.83 | 4.25 | 7 cycles (a battery is short circuited) |
| Comparative Example I5.2 | 1.27 | 4.20 | 19 cycles (a battery is short circuited) |
| Comparative Example I5.3 | 2.05 | 4.05 | 1610 cycles (80%) |
| Example I6 | 2.21 | 4.35 | 1536 cycles (80%) |
| Comparative Example I6.1 | 3.32 | 4.30 | 2 cycles (a battery is short circuited) |
| Comparative Example I6.2 | 1.62 | 4.35 | 17 cycles (a battery is short circuited) |
| Comparative Example I6.3 | 2.04 | 4.15 | 945 cycles (80%) |

The test results of the electrical conductivity and the electrochemical window of the solid-state electrolyte indicate the following: A polymer electrolyte prepared through polymerizing a polymer monomer with a specific structure in Group I examples of the present disclosure has a relatively high electrical conductivity. Polyether (polyether aluminate, polyether borate, or polyether phosphate), polyether (polyether aluminate, polyether borate, or polyether phosphate)+polyacrylate, and polyether acrylate were used in Group I comparative examples. One group of comparative examples are used as an example. Polyether (polyether aluminate, polyether borate, or polyether phosphate) with the same structure was used in Comparative Example I1.1. In data tests, an electrochemical window is narrow, and an electrical conductivity is high. Polyether (polyether aluminate, polyether borate, or polyether phosphate) and polyacrylate were blended in Comparative Example I1.2. Because polyacrylate does not have lithium conducting performance, polyacrylate has a relatively low electrical conductivity. A polyether acrylate-based polymer was used in Comparative Example I1.3. An electrical conductivity is close to that in the example, but an electrochemical window is relatively narrow.

Cycle performance test results of the lithium-ion battery indicate the following: The lithium-ion battery prepared in Group I examples of this disclosure has good cycle performance. One group of comparative examples are used as an example. Small molecules of a non-polymerizable substance exist in the battery in Comparative Example I1.1. The battery is prone to short-circuit in a high-voltage system due to these small molecules. Small molecules of a non-polymerizable substance exist in the battery in Comparative Example I1.2. However, a content of small polymer molecules is low in the battery. Therefore, the battery has higher cycle performance than that in Comparative Example I1.1, but is prone to short-circuit. A main difference between Comparative Example I1.3 and Example I1 is that polyether acrylate has a narrower electrochemical window than polyether borate acrylate, polyether aluminate acrylate, and polyether phosphate acrylate, and therefore causes fast oxidation and decomposition in a cycle process. As a result, cycle performance is affected.

GROUP II EXAMPLES

Group II examples are used to describe the gel polymer, the gel electrolyte, and the gel battery in the present disclosure.

A structure of polyether borate acrylate used in the following example is represented by Formula 6. Herein, $R_1$ is H, $R_2$ is absent, $R_3$ is H, and M is represented by Formula 2.

A structure of polyether borate methacrylate used in the following example is represented by Formula 6. Herein, $R_1$ is $CH_3$, $R_2$ is absent, $R_3$ is H, and M is represented by Formula 2.

A structure of polyether aluminate acrylate used in the following example is represented by Formula 6. Herein, $R_1$ is H, $R_2$ is absent, $R_3$ is H, and M is represented by Formula 4.

A structure of polyether aluminate methacrylate used in the following example is represented by Formula 6. Herein, $R_1$ is $CH_3$, $R_2$ is absent, $R_3$ is H, and M is represented by Formula 4.

A structure of polyether phosphate acrylate used in the following example is represented by Formula 6. Herein, $R_1$ is H, $R_2$ is absent, $R_3$ is H, and M is represented by Formula 5.

A structure of polyether phosphate methacrylate used in the following example is represented by Formula 6. Herein, $R_1$ is $CH_3$, $R_2$ is absent, $R_3$ is H, and M is represented by Formula 5.

Example II1

(1) Preparation of a Positive Electrode Plate

Mixing 95.5 g of a positive electrode active material: lithium cobaltate, 1.5 g of a binder: polyvinylidene fluoride (PVDF), 2.5 g of a conductive agent: conductive carbon black, and 0.5 g of a conductive agent: a carbon nanotube, adding 400 g N-methyl pyrrolidone (NMP), performing stirring under a function of a vacuum mixer until a mixed system became even fluid positive electrode slurry, evenly coating an aluminum foil with a thickness of 10 μm with the positive electrode slurry, performing drying processing for 36 hours at 80° C., performing vacuumizing processing to obtain the electrode plate, and compacting and then cutting the electrode plate, to obtain the positive electrode plate.

(2) Preparation of a Negative Electrode Plate

Dissolving 20 g silicon monoxide, 71 g graphite, 5 g of a conductive agent: a carbon nanotube, 2.5 g of a butylbenzene binder, and 1.5 g carboxymethyl cellulose sodium in 300 g water, performing evenly mixing, coating a surface of a copper foil of a negative electrode current collector with the mixed liquid, and performing drying (temperature: 80° C., time: 20 h), compacting, and die cutting to obtain the negative electrode plate.

(3) Preparation of a Gel Polymer Membrane Electrolyte

Stirring 80 g polyether borate acrylate (in the structure represented by Formula 6, $R_1$ is H, $R_2$ is absent, $R_3$ is H, and M is represented by Formula 2), 20 g methyl methacrylate (in the structure represented by Formula 9, $R_4$ is $CH_3$, and $R_5$ is $OCH_3$), and a first solvent for 300 min at a rotational speed of 1000 r/min in an argon gas atmosphere, adding 0.05 g azobisisobutyronitrile, reacting for 20 h under a condition of 75° C., performing purification processing, obtaining a gel polymer membrane through preparation by using a tape casting method, and soaking the gel polymer membrane in an electrolytic solution (an electrolytic solution used in a commercially used lithium-ion battery) for 24 h to obtain the gel polymer electrolyte membrane.

(4) Preparation of a Lithium-Ion Battery

Laminating the positive electrode plate, the gel polymer electrolyte membrane, and the negative electrode plate that were obtained above to prepare a lithium-ion battery cell, and performing welding, packaging, formation, and sorting to obtain the lithium-ion battery.

Comparative Example II1.1

Reference is made to Example II1 for a specific process. A main difference is that polyethylene oxide with the same weight and the same molecular weight was used in Comparative Example II1.1 to replace a gel polymer in Example II1. Other conditions in Example 1 remained unchanged.

Comparative Example II1.2

Reference is made to Example II1 for a specific process. A main difference is that monomers in a system in Comparative Example II1.2 were 0 g polyether borate acrylate (in the structure represented by Formula 6, $R_1$ is H, $R_2$ is absent, $R_3$ is H, and M is represented by Formula 2) and 100 g methyl methacrylate (in the structure represented by Formula 9, $R_4$ is $CH_3$, and $R_5$ is $OCH_3$). Other conditions in Example II1 remained unchanged.

Comparative Example II1.3

Reference is made to Example II1 for a specific process. A main difference is that monomers in a system in Comparative Example II1.3 were 100 g polyether borate acrylate (in the structure represented by Formula 6, $R_1$ is H, $R_2$ is absent, $R_3$ is H, and M is represented by Formula 2) and Og methyl methacrylate (in the structure represented by Formula 9, $R_4$ is $CH_3$, and $R_5$ is $OCH_3$). Other conditions in Example II1 remained unchanged.

Examples II2 and II3

Reference is made to Example II1 for a specific process. Main differences are a process condition, addition amounts of components, and types of component materials. For details, refer to Table 4.

TABLE 4

Contents of components and preparation conditions of gel polymers in Group II examples and Group II comparative examples

| Number | First solvent/g | Compound represented by Formula 6/g | Gellable monomer/g | Initiator/g | Stirring speed r/min | Stirring time/min | Reaction temperature (° C.) | Reaction time (h) |
|---|---|---|---|---|---|---|---|---|
| Example II1 | 500 g xylene | 80 g polyether borate acrylate | 20 g methyl methacrylate | 0.05 g azobisiso-butyronitrile | 1000 | 300 | 75 | 20 |
| Comparative Example II1.1 | — | — | — | — | 1000 | 300 | 75 | 20 |

TABLE 4-continued

Contents of components and preparation conditions of gel polymers in Group II examples and Group II comparative examples

| Number | First solvent/g | Compound represented by Formula 6/g | Gellable monomer/g | Initiator/g | Stirring speed r/min | Stirring time/min | Reaction temperature (° C.) | Reaction time (h) |
|---|---|---|---|---|---|---|---|---|
| Comparative Example III.2 | 500 g xylene | — | 100 g methyl methacrylate | 0.05 g azobisiso-butyronitrile | 1000 | 300 | 75 | 20 |
| Comparative Example III.3 | 500 g xylene | 100 g polyether borate acrylate | — | 0.05 g azobisiso-butyronitrile | 1000 | 300 | 75 | 20 |
| Example II2 | 100 g N-methyl pyrrolidone | 60 g polyether aluminate acrylate | 50 g acyclic acid | 0.01 g 2,2'-azobis (2,4-dimethyl) valeronitrile | 1500 | 320 | 55 | 20 |
| Example II3 | 450 g hydro-fluoroether | 80 g polyether phosphate methacrylate | 12 g poly(ethylene glycol) acrylate | 0.08 g benzoyl peroxide | 500 | 240 | 95 | 3 |
| Example II4 | 400 g toluene | 100 g polyether aluminate methacrylate | 0.5 g acrylonitrile | 0.18 g azobisiso-butyronitrile | 1100 | 350 | 60 | 11 |
| Example II5 | 250 g xylene | 70 g polyether borate methacrylate | 15 g metha-crylonitrile | Tert-butyl peroxyben-zoate | 400 | 500 | 90 | 15 |
| Example II6 | 400 g xylene | 65 g polyether borate acrylate | 20 g methyl acrylate | 0.35 g azobisiso-butyronitrile | 800 | 200 | 65 | 18 |
| Example II7 | 300 g toluene | 70 g polyether aluminate acrylate | 35 g ethyl acrylate | 0.15 g benzoyl peroxide | 750 | 180 | 80 | 8 |
| Example II8 | 420 g tetrahydro-furan | 75 g polyether phosphate acrylate | 30 g ethyl methylacrylate | 0.30 g azobisiso-butyronitrile | 1700 | 120 | 70 | 13 |
| Example II9 | 600 g hydro-fluoroether | 80 g polyether phosphate methacrylate | 45 g poly(ethylene glycol) methacrylate | 0.45 g benzoyl peroxide | 200 | 600 | 85 | 24 |
| Example II10 | 260 g tetrahydro-furan | 85 g polyether aluminate acrylate | 32 g metha-crylonitrile | 0.25 g azobisiso-butyronitrile | 700 | 1.8 | 60 | 36 |
| Example II11 | 400 g hydro-fluoroether | 90 g polyether borate acrylate | 18 g acrylonitrile | 0.15 g benzoyl peroxide | 1200 | 480 | 75 | 50 |
| Example II12 | 300 g toluene | 92 g polyether borate methacrylate | 22 g ethyl acrylate | 0.5 g azobisiso-butyronitrile | 870 | 520 | 65 | 42 |
| Example II13 | 600 g xylene | 75 g polyether borate acrylate | 35 g ethyl methylacrylate | 0.1 g tert-butyl peroxybenzoate | 950 | 380 | 80 | 36 |

Test Example II

The following tests were performed on the products prepared in Group II examples and Group II comparative examples:

(1) Test of an Electrochemical Window

The gel polymer membranes prepared in Group II examples and Group II comparative examples were soaked in an electrolytic solution for 24 h, and were assembled into a stainless steel/gel polymer electrolyte/lithium plate structure. A Chenhua CHE66E electrochemical workstation was used to test electrochemical stability of the gel polymer electrolyte. A test interval was 2 V-6 V, and a test frequency was 0.05 mV/S. Test results are shown in Table 5.

(2) Test of an Electrical Conductivity

The gel polymer membranes prepared in Group II examples and Group II comparative examples were soaked in an electrolytic solution for 24 h, and were assembled into a stainless steel/gel polymer electrolyte/stainless steel structure. A Chenhua CHE660E electrochemical workstation was used to test an alternating current impedance of the gel polymer electrolyte. An impedance and a thickness of the gel polymer electrolyte were tested to calculate an electrical conductivity. Test results are shown in Table 5.

Figure 2:
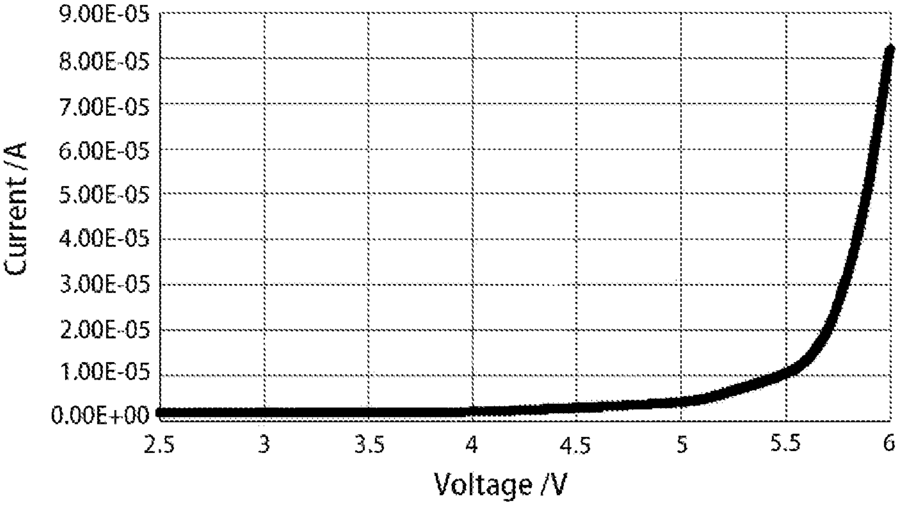
FIG. 2 shows test results of an LSV curve of a gel polymer electrolyte prepared in Comparative Example II1.1.
Figure 3:
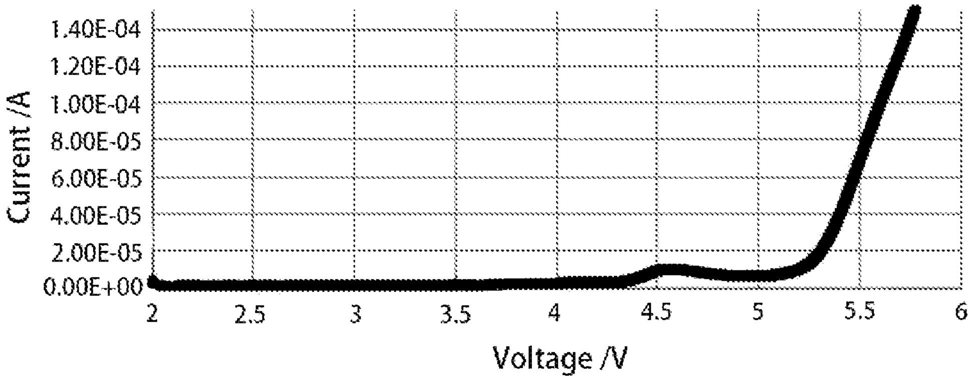
FIG. 3 shows test results of an LSV curve of a gel polymer electrolyte prepared in Comparative Example II1.2.
Figure 4:
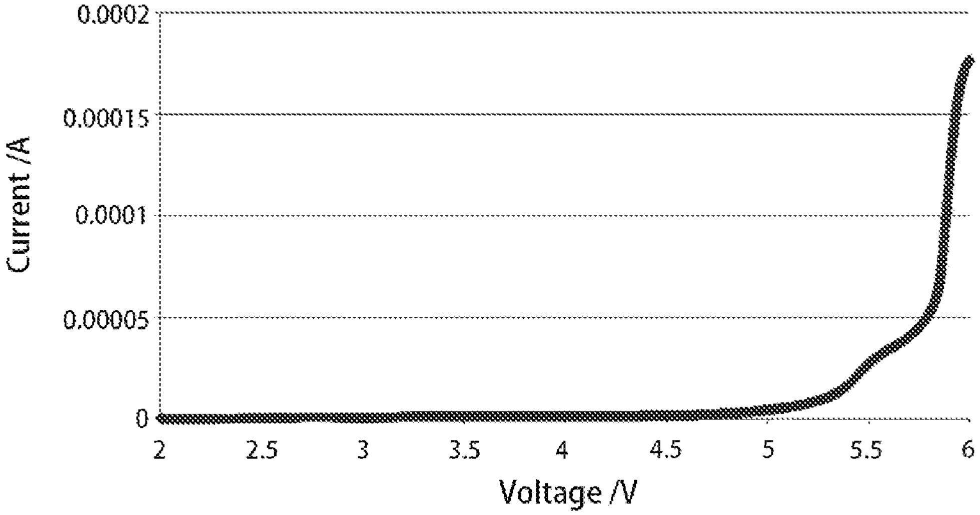
FIG. 4 shows test results of an LSV curve of a gel polymer electrolyte prepared in Comparative Example II1.3.

(3) Test results of electrochemical stability of the polymer electrolytes in Example II1, Comparative Example II1.1, Comparative Example II1.2, and Comparative Example II1.3 were analyzed. Results are shown in FIG. 1 to FIG. 4. In the figure, a horizontal coordinate is a voltage (unit: V), and a vertical coordinate is a current (unit: A).

TABLE 5

Test results of electrochemical windows and electrical conductivities of the gel polymers in Group II examples and Group II comparative examples

| Number | Electrochemical window/V | Electrical conductivity/(mS/cm) |
|---|---|---|
| Example II1 | 4.45 | 4.81 |
| Comparative Example II1.1 | 3.80 | 4.22 |
| Comparative Example II1.2 | 4.40 | 3.35 |
| Comparative Example II1.3 | 4.50 | 4.31 |
| Example II2 | 4.48 | 4.78 |
| Example II3 | 4.48 | 4.93 |
| Example II4 | 4.50 | 4.58 |
| Example II5 | 4.49 | 4.72 |
| Example II6 | 4.46 | 4.84 |
| Example II7 | 4.43 | 4.91 |
| Example II8 | 4.45 | 4.96 |
| Example II9 | 4.52 | 4.85 |
| Example II10 | 4.48 | 4.74 |
| Example II11 | 4.51 | 4.78 |
| Example II12 | 4.49 | 4.83 |
| Example II13 | 4.50 | 4.77 |

It may be learned from the results in Table 5 and FIG. 1 to FIG. 4 that, an electrochemical window of the gel polymer electrolyte prepared in Example II1 is about 4.45 V, an electrochemical window of the polymer electrolyte prepared in Comparative Example II1.1 is about 3.80 V, an electrochemical window of the gel polymer electrolyte prepared in Comparative Example II1.2 is about 4.40 V, and an electrochemical window of the gel polymer electrolyte prepared in Comparative Example II1.3 is about 4.50 V. It indicates that the gel polymer electrolyte in the present invention has good electrochemical stability, and may match a high-voltage positive electrode material and have a good application prospect.

The electrochemical stability test results and the alternating-current impedance test results indicate that, an electrical conductivity of the gel polymer electrolyte prepared in Example II1 is about 4.81 mS/cm, an electrical conductivity of the polymer electrolyte prepared in Comparative Example II1.1 is about 4.22 mS/cm, an electrical conductivity of the gel polymer electrolyte prepared in Comparative Example II1.2 is about 3.35 mS/cm, and an electrical conductivity of the gel polymer electrolyte prepared in Comparative Example II1.3 is about 4.31 mS/cm.

The test results indicate that the polymer monomer with the specific structure shown in the examples of the present invention may effectively improve an electrical conductivity of lithium ions and electrochemical stability of the electrolyte. A main reason is that the polymer monomer in the present invention is polymerized by two types of monomers. The gel polymer electrolyte in the present invention has a comb-like structure. A branched chain has a poly boron ether structure, a poly aluminum ether structure, or a poly phosphorous ether structure. This type of structure may be used for lithium conducting, and have good electrochemical stability. In addition, the gel polymer electrolyte in the present invention is copolymerized by two types of monomers, has a low crystallization degree, better affinity to the electrolyte, and a higher electrical conductivity. The gel polymer electrolyte prepared in Example II1 has good comprehensive performance.

(4) Rate Test

The rate test is performed on the lithium-ion batteries prepared in Example II1, Comparative Example II1.1, Comparative Example II1.2, Comparative Example II1.3, and Example 112 to Example 1113. A test process is as follows: performing charge and discharge rate tests on the lithium-ion battery on a LAND battery charge and discharge test cabinet at 3.0 V-4.45 V, where a test condition was 25° C.; and performing rate charging and discharging on the battery at rates of 0.2 C/0.2 C, 0.5 C/0.5 C, 1.0 C/1.0 C, and 1.5 C/1.5 C by using a non-cycled battery, to test rate performance of the battery. Test results are shown in Table 6.

TABLE 6

Rate performance test results of batteries in Group II examples and Group II comparative examples

| | Capacity retention | | | |
|---|---|---|---|---|
| | 0.2 C/0.2 C | 0.5 C/0.5 C | 1.0 C/1.0 C | 1.5 C/1.5 C |
| Example II1 | 100% | 97.8% | 95.3% | 94.5% |
| Comparative Example II1.1 | 100% | 94.3% | 88.4% | 85.2% |
| Comparative Example II1.2 | 100% | 95.6% | 92.3% | 90.7% |
| Comparative Example II1.3 | 100% | 96.4% | 93.1% | 91.3% |
| Example II2 | 100% | 97.1% | 94.9% | 93.3% |
| Example II3 | 100% | 98.3% | 96.5% | 95.1% |
| Example II4 | 100% | 96.7% | 94.2% | 92.4% |
| Example II5 | 100% | 97.2% | 94.6% | 93.9% |
| Example II6 | 100% | 98.0% | 95.2% | 94.7% |
| Example II7 | 100% | 97.5% | 94.9% | 93.7% |
| Example II8 | 100% | 98.5% | 96.8% | 95.3% |
| Example II9 | 100% | 98.2% | 95.8% | 94.9% |
| Example II10 | 100% | 97.0% | 95.0% | 93.6% |
| Example II11 | 100% | 97.5% | 95.2% | 93.9% |
| Example II12 | 100% | 97.4% | 95.1% | 94.1% |
| Example II13 | 100% | 97.5% | 95.0% | 93.5% |

The results in Table 6 indicate that the lithium-ion battery prepared in Example II1 of the present disclosure has better rate performance, especially a rate greater than 0.5 C. A main reason is that, when the gel polymer electrolyte in the lithium-ion battery in Example II1 is compared with those in Comparative Example II1.1, Comparative Example II1.2, and Comparative Example II1.3, the gel polymer electrolyte prepared in Example II1 has a higher electrical conductivity of lithium ions and better electrochemical stability.

It may be learned from Group I examples and Group II examples that no matter whether the polymer in the present disclosure is used in the solid-state electrolyte or the gel electrolyte, the polymer may effectively improve transmission performance of lithium ions, reduce an internal resistance of the lithium-ion battery, and effectively improve cycle performance of the battery. In addition, high-voltage withstand performance of the polymer electrolyte may be effectively improved, and better electrochemical stability may be ensured.

The foregoing illustrates the implementation of the present application. However, the present application is not limited to the foregoing implementation. Any modifications, equivalent replacements, and improvements made without departing from the spirit and principle of the present application shall fall within the protection scope of the present application.

What is claimed is:

1. A polymer, wherein the polymer comprises a repeating unit A, and the repeating unit A has a structure represented by Formula 1:

Formula 1

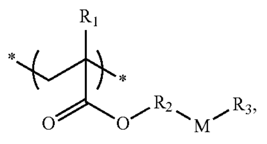

wherein in Formula 1, $R_1$ is selected from H or $C_{1-6}$ alkyl; $R_2$ is a linking group; $R_3$ is an end-capping group; M is selected from a borate chain segment, an aluminate chain segment, or a phosphate chain segment; and * denotes a linking end;

the polymer is a gel polymer, and the gel polymer further comprises a repeating unit B, the repeating unit B has a structure represented by Formula 7:

Formula 7

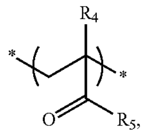

wherein $R_4$ is selected from H or $C_{1-6}$ alkyl; $R_5$ is a polyether chain segment, the polyether chain segment has a structural unit represented by Formula 8:

Formula 8

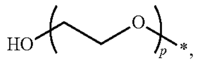

wherein in Formula 8, * denotes a linking end, and p is a polymerization degree.

2. The polymer according to claim 1, wherein $R_1$ is selected from H, methyl, ethyl, or propyl; and/or $R_3$ is selected from H, OH, or COOH.

3. The polymer according to claim 1, wherein the borate chain segment has a structural unit represented by Formula 2 or Formula 3:

Formula 2

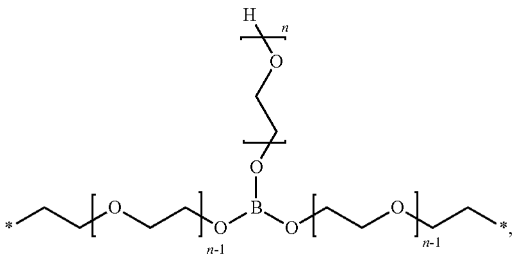

and

-continued

Formula 3

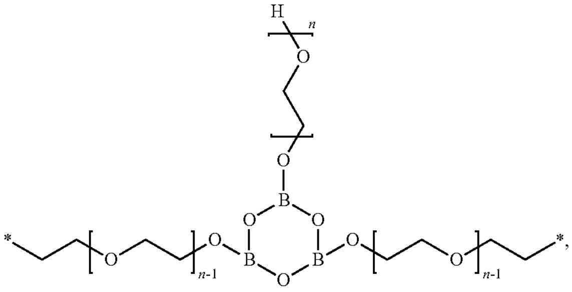

wherein in Formula 2 and Formula 3, * denotes a linking end, and n is a polymerization degree; and/or the aluminate chain segment has a structural unit represented by Formula 4:

Formula 4

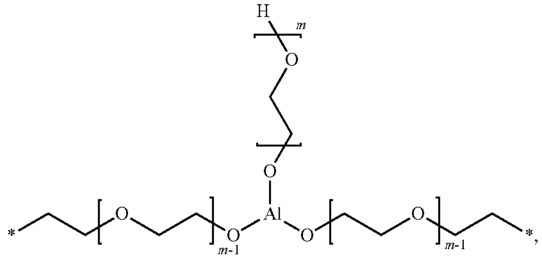

wherein in Formula 4, * denotes a linking end, and m is a polymerization degree; and/or the phosphate chain segment has a structural unit represented by Formula 5:

Formula 5

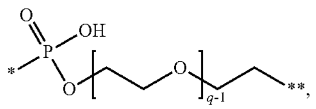

wherein in Formula 5, * denotes a linking end to $R_3$, ** denotes a linking end to $R_2$, and q is a polymerization degree.

4. The polymer according to claim 1, wherein a number average molecular weight of M ranges from 200 Da to 10000 Da.

5. The polymer according to claim 1, wherein the gel polymer further comprises a repeating unit C, the repeating unit C has a structure represented by Formula 7':

Formula 7'

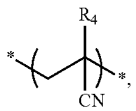

wherein $R_4$ is selected from H or $C_{1-6}$ alkyl; and * denotes a linking end.

6. The polymer according to claim 5, wherein in at least one of Formula 7 and 7', $R_4$ is selected from H or $C_{1-3}$ alkyl.

7. The polymer according to claim 5, wherein in the gel polymer, a mole percent of the repeating unit A ranges from 30 mol % to 99 mol %, and a mole percent of the repeating unit B and the repeating unit C ranges from 1 mol % to 70 mol %.

8. The polymer according to claim 1, wherein a number average molecular weight of the polyether chain segment ranges from 60 Da to 3000 Da.

9. The polymer according to claim 1, wherein a number average molecular weight of the gel polymer ranges from 1000 Da to 500000 Da; and/or an electrical conductivity of the gel polymer is greater than 4.5 mS/cm.

10. A gel electrolyte, comprising the polymer according to claim 1.

11. The gel electrolyte according to claim 10, wherein the gel electrolyte further comprises an electrolyte.

12. A battery, comprising the gel electrolyte according to claim 10.

* * * * *